H. D. THOMAS.
DISH WASHING MACHINE.
APPLICATION FILED MAR. 30, 1908.

923,215.

Patented June 1, 1909.

2 SHEETS—SHEET 1.

Inventor
Harry D. Thomas
By C. W. Miles
Attorney

H. D. THOMAS.
DISH WASHING MACHINE.
APPLICATION FILED MAR. 30, 1908.

923,215.

Patented June 1, 1909.
2 SHEETS—SHEET 2.

Witnesses
A. Orendoff
A. McCormack

Inventor
Harry D. Thomas
By C. W. Miles
Attorney

UNITED STATES PATENT OFFICE.

HARRY D. THOMAS, OF CINCINNATI, OHIO.

DISH-WASHING MACHINE.

No. 923,215.  Specification of Letters Patent.  Patented June 1, 1909.

Application filed March 30, 1908. Serial No. 423,986.

*To all whom it may concern:*

Be it known that I, HARRY D. THOMAS, citizen of the United States, residing at Cincinnati, in the county of Hamilton and State of Ohio, have invented certain new and useful Improvements in Dish-Washing Machines, of which the following is a specification.

My invention relates to improvements in dish-washing machines.

One of its objects is to provide simple and efficient mechanism which may be operated by hand or by power for washing or cleaning dishes.

Another object is to provide an improved circulation of the cleansing liquid and means for maintaining such circulation.

Another object is to provide a dish-holding basket and means for supporting and rotating the same.

Figure 1:
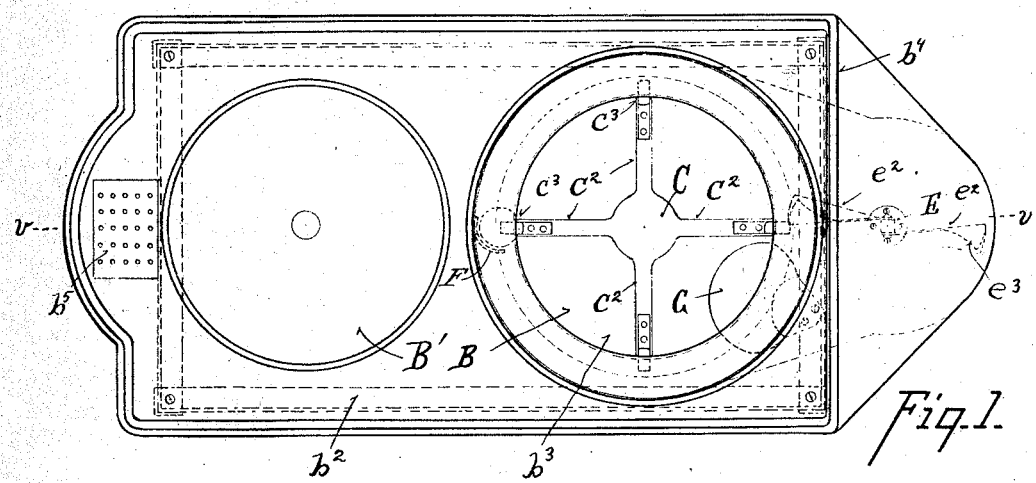
Figure 2:
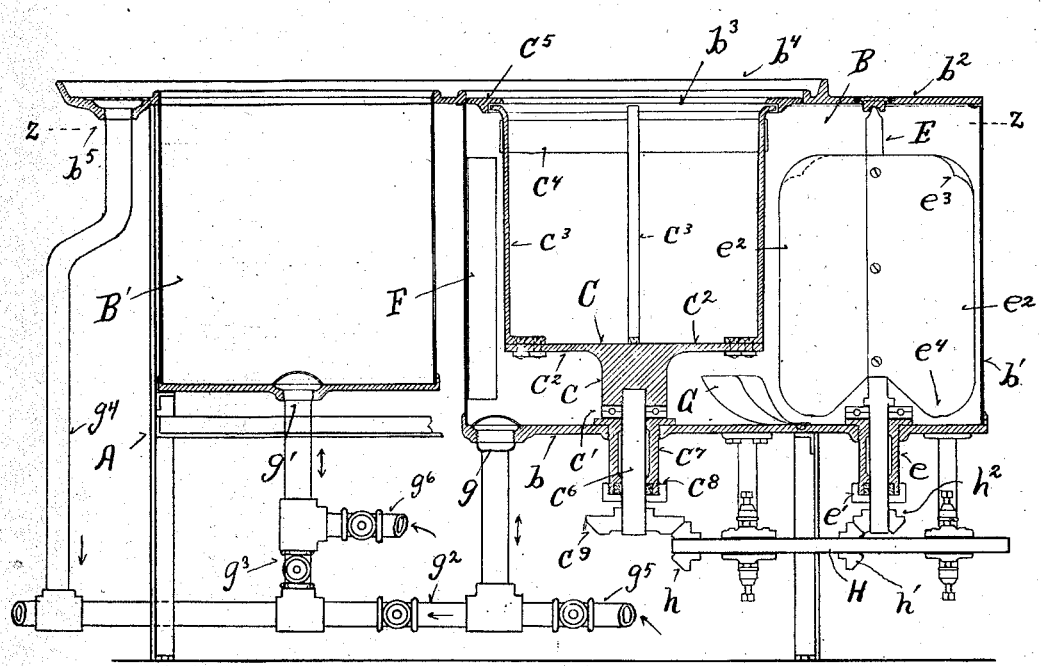
Figure 8:
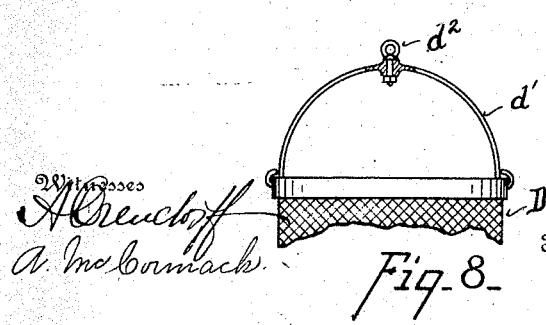
Figure 3:
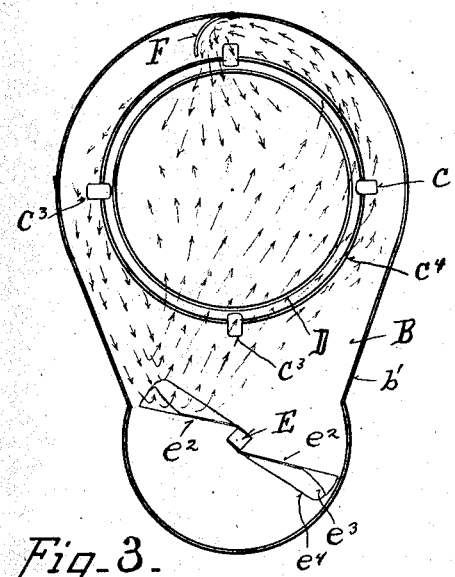
Figure 4:
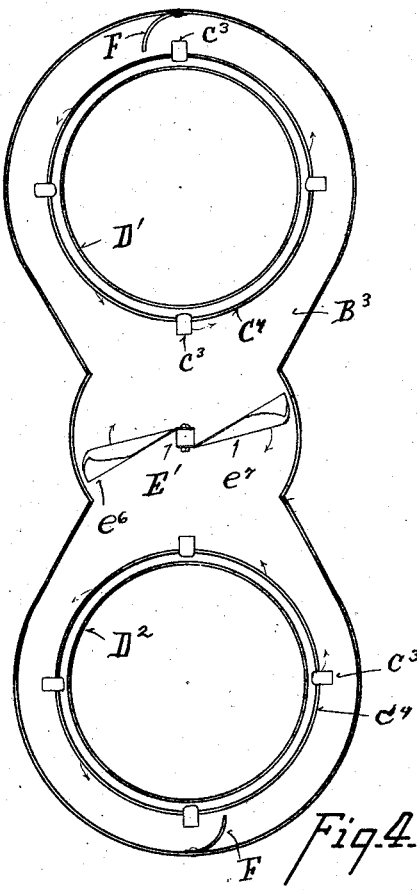
Figure 5:
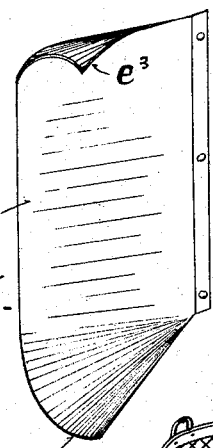
Figure 6:
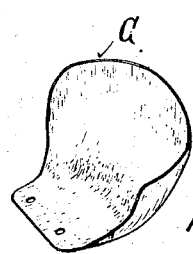
Figure 7:
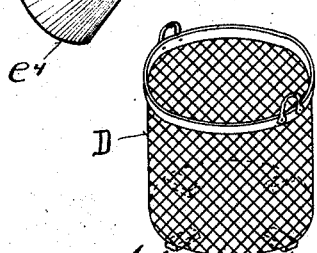

It further consists in certain details of form, combination and arrangement, all of which will be more fully set forth in the description of the accompanying drawings, in which:

Figure 1 is a top plan view of my improved mechanism. Fig. 2 is a central vertical section on line $v$—$v$ of Fig. 1. Fig. 3 is a sectional diagram on line $z$—$z$ of Fig. 2 illustrating the path followed by the circulating cleansing medium. Fig. 4 is a view similar to Fig. 3 illustrating the arrangement of two baskets in connection with one circulating member. Fig. 5 is a detail of one of the circulating members or blades. Fig. 6 is a perspective view of one of the stationary deflectors. Fig. 7 is a perspective view of one of the removable baskets. Fig. 8 is a detail of a basket with bail and swivel support.

In the accompanying drawings, A represents the supporting frame, B represents a tank in which the dishes are cleaned, and B' a tank containing clean boiling water in which the dishes may be rinsed.

The tank B is preferably composed of a cast metal bottom $b$, sheet metal side walls $b'$ and a cast metal top plate $b^2$ having an opening $b^3$ over tank B. The tank B' is similarly formed except that it is entirely open at the top; the top plate $b^2$ is to be extended to encircle the upper edges of tank B' and be provided with raised ribs or rims around the tank openings and a raised outer rim $b^4$, and a drain $b^5$ to catch and conduct away any water which may be spilled or splashed from the tanks.

C represents a rotating frame or skeleton basket composed of the hub $c$ which is journaled and supported upon the bottom of tank B at $c'$ and a series of arms $c^2$ projecting radially from said hub and carrying upwardly projecting arms $c^3$ which are united at their upper ends by a circular band $c^4$. A rim $c^5$ is secured by lugs to the top plate $b^2$. A vertical shaft $c^6$ carried by hub $c$ passes downward through a journal box $c^7$ and stuffing box $c^8$, and is provided at its lower end with a gear $c^9$ by means of which power is transmitted to rotate the frame C.

A detachable perforated basket D which may be formed from perforate sheet metal or woven wire is adapted to be seated over the radial arms $c^2$ and upon the lower horizontal ends of arms $c^3$ and laterally supported by the vertical arms $c^3$. The basket D is provided with lugs on feet $d$ which engage the lower horizontal ends of arms $c^3$ so that the rotary motion of frame C is imparted to basket D. In large machines the baskets D are provided with a bail $d'$ to which is pivotally attached an eye or hook $d^2$ by means of which the baskets may be lifted into or from tank B, preferably by means of a crane, not shown, without stopping the machinery.

E represents a vertical shaft supported upon and journaled in journal box $e$ and provided with a stuffing box $e'$. Within the tank B the shaft E is provided with one or more blades $e^2$ which serve to circulate the liquid contents of tank B, so as to bring the liquid into intimate contact with all parts of the dishes in basket D. In order to enable the blades to most effectively circulate the liquid through the basket, I provide the blades with forwardly turned upper and lower edges $e^3$, $e^4$, and also provide a stationary deflector plate F attached to the side of the tank, preferably on the opposite side of the basket from shaft E and a stationary deflector plate G attached to the bottom of the tank beneath the basket to deflect the liquid upwardly into the bottom of the basket.

H represents the main driving shaft which may be driven by belt and pulley, or other driving gear, for large machines, or may be provided with a crank and operated by hand in small machines. Shaft H is provided with a gear $h$ meshing with the gear $c^9$ and a gear $h'$ which engages and drives a gear $h^2$ on the lower end of shaft E. The several gears are preferably so proportioned that the shaft E rotates more rapidly than shaft $c^6$, in order to produce a vigorous circulation, and to present all parts of the basket to the full force of the current.

In operation the dishes are packed in the basket D, which is then lifted and seated in the frame C, the tank B being nearly filled with a warm solution preferably soapy or alkaline. The basket and shaft E are then rotated, which causes the liquid to circulate in the direction indicated by the arrows in Fig. 3 passing from the blades through the basket and around to the deflector F, which returns the current into the basket so that the two currents meet in the basket and mutually deflect each other. The lower portion of the blades also direct a strong current into the deflector G which deflects it upward into the lower portion of the basket. Thus all parts of each dish of whatever shape are subjected to the action of the various currents set up in the liquid and thoroughly cleansed.

After the dishes have been cleaned in tank B, the basket is lifted from tank B and set into tank B', where the dishes are rinsed by being immersed in clean hot water and the basket then removed to drain.

Tanks B, B' are provided with drains $g$, $g'$, which are preferably connected by valve-controlled pipes $g^2$, $g^3$, with the pipe $g^4$ which leads from drain $b^5$. Valve-controlled pipes $g^5$, $g^6$, serve to supply fresh water to tanks B, B'. In practice, hot water is supplied in small quantity through pipe $g^6$ continuously while the machine is in operation, and allowed to overflow the rim of tank B' to keep a constant supply of clean water in tank B'. Water is supplied from time to time as required through pipe $g^5$.

As shown in Fig. 4 two baskets D', D² are adapted to be employed in one tank B³ in connection with a single shaft E' carrying circulating blades $e^6$, $e^7$. In this form, a rinsing tank such as shown at B', Fig. 2, may be located at either end of tank B³. The circulation for the respective baskets D', D² is the same as described and indicated in Fig. 3.

The mechanism herein illustrated and described is capable of considerable modification without departing from the principle of my invention.

Having described my invention, what I claim is:

1. In a mechanism of the character indicated, an oblong tank, a frame adapted to be rotated within said tank upon a vertical axis, a detachable perforated basket adapted to be supported and rotated by said frame, a vertical shaft provided with one or more circulating blades mechanism to rotate said shaft to circulate a liquid contained in said tank through said basket and a vertically disposed stationary deflector plate at the side of said basket opposite said shaft to deflect said liquid into said basket from the opposite side.

2. In a mechanism of the character indicated, an oblong tank, a frame adapted to be rotated within said tank upon a vertical axis, a detachable perforated basket adapted to be supported and rotated by said frame, a vertical shaft provided with one or more circulating blades located within said tank at one side of said basket and extending below said basket and adapted to be rotated to circulate a liquid contained in said tank through said basket, and a stationary deflecting plate located beneath said basket to deflect the liquid into the bottom of said basket.

3. In a mechanism of the character indicated, a cleansing tank, a perforated basket to hold the dishes, mechanism to support and rotate said basket upon a vertical axis within said tank, and a supporting member vertically swiveled relative to the upper portion of said basket, said supporting member being adapted to lift said basket into and from said tank while said rotating and circulating mechanism are in motion.

4. In a mechanism of the character indicated an oblong tank, a perforated basket located within and at one end of said tank, mechanism adapted to rotate said basket upon a vertical axis, a vertical shaft located within said tank at one side of said basket, said shaft being provided with a circulating blade extending into said tank lower than the bottom of said basket, mechanism to rotate said shaft to circulate a liquid contained in said tank through said basket, a stationary deflector plate to deflect the liquid, after it has passed through said basket, back into said basket, and a stationary deflector beneath said basket to deflect the liquid into the bottom of said basket.

5. In a mechanism of the character indicated an oblong tank, a perforated basket located within and at one end of said tank, mechanism adapted to rotate said basket upon a vertical axis, a vertical shaft located within said tank at one side of said basket, said shaft being provided with a circulating blade and adapted to be rotated to circulate a liquid contained in said tank through said basket, and a stationary deflector plate located at the bottom of said tank to deflect the liquid upward into the bottom of said basket.

6. In a mechanism of the character indicated a tank, a perforated basket located within said tank mechanism adapted to rotate said basket upon a vertical axis, a vertical shaft located within said tank at one side of said basket, said shaft being provided with a circulating blade and adapted to be rotated to circulate a liquid contained in said tank through said basket, a stationary deflector plate to deflect said liquid upwardly into the bottom of said basket, and a stationary deflector plate to deflect the liquid which has passed through and around said basket into the basket at the side opposite said circulating shaft.

7. In a mechanism of the character indicated, a cleansing tank, a perforated basket to hold the dishes, mechanism to support and rotate said basket upon a vertical axis within said tank, said basket being provided with a bail, and a supporting member vertically swiveled on said bail to enable said basket to be removed from the tank while the rotating and circulating mechanism are in action.

In testimony whereof I have affixed my signature in presence of two witnesses.

HARRY D. THOMAS.

Witnesses:
 WALTER F. MURRAY.
 C. W. MILES.